US010065577B2

United States Patent
Braggion et al.

(10) Patent No.: US 10,065,577 B2
(45) Date of Patent: Sep. 4, 2018

(54) PLASTIC J-HOOK RETAINER WITH RUBBER

(71) Applicant: Lear Corporation, Southfield, MI (US)

(72) Inventors: Angela Braggion, Rivalta di Turin (IT); Maurizio Atragene, Rivalta di Turin (IT); Marco Rossi, Nichelino (IT)

(73) Assignee: LEAR CORPORATION, Southfield, MI (US)

(*) Notice: Subject to any disclaimer, the term of this patent is extended or adjusted under 35 U.S.C. 154(b) by 153 days.

(21) Appl. No.: 14/163,582

(22) Filed: Jan. 24, 2014

(65) Prior Publication Data

US 2014/0237777 A1  Aug. 28, 2014

Related U.S. Application Data

(60) Provisional application No. 61/769,939, filed on Feb. 27, 2013.

(51) Int. Cl.
*B60R 13/02* (2006.01)
*F16B 2/22* (2006.01)
*F16B 5/06* (2006.01)

(52) U.S. Cl.
CPC .......... *B60R 13/0206* (2013.01); *F16B 2/22* (2013.01); *F16B 5/0692* (2013.01); *F16B 5/0635* (2013.01); *Y10T 24/30* (2015.01); *Y10T 24/309* (2015.01)

(58) Field of Classification Search
CPC ... Y10T 24/30; Y10T 24/309; B60R 13/0206; F16B 2/22; F16B 5/0692; F16B 5/0635

USPC ..................................................... 24/289, 297
See application file for complete search history.

(56) References Cited

U.S. PATENT DOCUMENTS

| | | | | |
|---|---|---|---|---|
| 3,928,898 A * | 12/1975 | Smoot | ......... | A47C 31/023 24/532 |
| 5,480,201 A * | 1/1996 | Mercer | ......... | B66C 1/30 294/111 |
| 5,820,213 A * | 10/1998 | Severinski | ......... | A47C 31/023 24/336 |
| 5,826,939 A * | 10/1998 | Beyer | ......... | B60N 2/5825 24/369 |
| 5,848,818 A * | 12/1998 | Flueckinger | ......... | B60R 9/00 296/100.02 |
| 7,073,693 B2 * | 7/2006 | Law | ......... | B60N 2/5883 223/50 |
| 7,891,735 B2 * | 2/2011 | Oku | ......... | B60N 2/6009 297/218.3 |
| 8,157,324 B2 * | 4/2012 | Matsuzaki | ......... | B60N 2/5816 297/218.1 |

(Continued)

FOREIGN PATENT DOCUMENTS

DE  2321340 A1  12/1973
DE  602004006818 T2  1/2008

(Continued)

*Primary Examiner* — David M Upchurch
(74) *Attorney, Agent, or Firm* — Brooks Kushman P.C.

(57) ABSTRACT

A J-hook retainer includes a rigid structural component shaped with a hooked end. A soft rubber section is applied to or molded with the rigid structural component. The J-hook retainer holds a trim fabric in place over a vehicle component frame. Advantageously, the soft rubber section minimizes free play and rattling as well as assisting in avoiding sliding and detachment in case of partial contact between the J-hook retainer and vehicle component frame.

13 Claims, 3 Drawing Sheets

(56) References Cited

U.S. PATENT DOCUMENTS

| | | | | |
|---|---|---|---|---|
| 8,240,759 B2 * | 8/2012 | Hobl | ............... | B60N 2/5825 |
| | | | | 297/218.1 |
| 8,911,022 B2 * | 12/2014 | Pleskot | ............... | B60N 2/5825 |
| | | | | 297/218.3 |
| 8,926,013 B2 * | 1/2015 | Kurashita | ............ | B60N 2/7011 |
| | | | | 297/218.3 |
| 2002/0138953 A1 * | 10/2002 | Passafiume | ............... | A45F 5/00 |
| | | | | 24/306 |
| 2003/0151280 A1 * | 8/2003 | Hashiguchi | ......... | B60N 2/5825 |
| | | | | 297/218.1 |
| 2006/0178603 A1 | 8/2006 | Popescu | | |
| 2007/0209871 A1 | 9/2007 | Winchcombe | | |
| 2008/0235914 A1 * | 10/2008 | Dolberg | ............... | B60N 3/026 |
| | | | | 16/430 |
| 2011/0303371 A1 * | 12/2011 | Harrison | ............... | B60J 1/2011 |
| | | | | 160/370.21 |
| 2011/0309120 A1 * | 12/2011 | Noonan | .............. | B60R 9/048 |
| | | | | 224/309 |
| 2012/0011721 A1 * | 1/2012 | Budinich | ............... | B62D 33/06 |
| | | | | 29/897.2 |
| 2012/0080465 A1 * | 4/2012 | Son | ........................ | B60R 11/02 |
| | | | | 224/276 |
| 2012/0102680 A1 * | 5/2012 | Leon | ..................... | B63B 21/00 |
| | | | | 24/129 R |
| 2013/0062918 A1 * | 3/2013 | Itakura | ............... | B60N 2/6027 |
| | | | | 297/219.1 |

FOREIGN PATENT DOCUMENTS

| | | | |
|---|---|---|---|
| DE | 102007034187 | A1 | 1/2009 |
| EP | 1535782 | A1 | 1/2005 |
| WO | 2009012844 | A1 | 1/2009 |

* cited by examiner

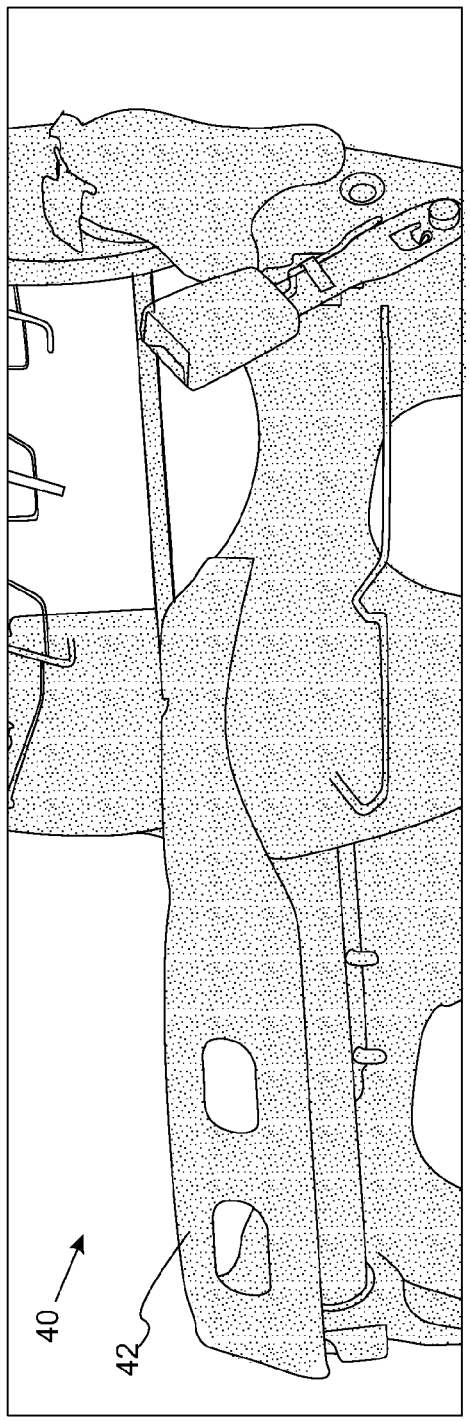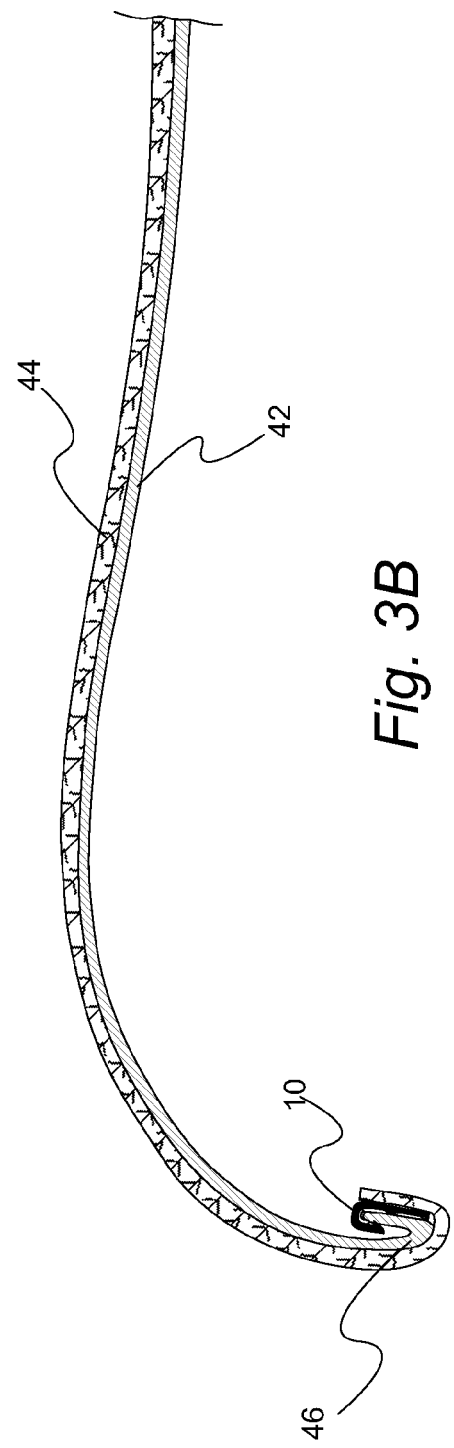
Fig. 3A
Fig. 3B

PLASTIC J-HOOK RETAINER WITH RUBBER

CROSS-REFERENCE TO RELATED APPLICATIONS

This application claims the benefit of U.S. provisional application Ser. No. 61/769,939 filed Feb. 27, 2013, the disclosure of which is hereby incorporated in its entirety by reference herein.

TECHNICAL FIELD

In at least one aspect, the present invention is related to methods and components for attaching vehicle trim.

BACKGROUND

Various fastening mechanisms are used to attach interior trim to structural components in an automotive vehicle interior. One such fastening mechanism includes a hooked shape stripe of plastic attached to a fabric trim. This fastener is typically referred to as a "J-hook." J-hook fasteners are used to attach fabric trim to metal or plastic structural components of interior vehicle components such as driver and passenger seats including rear seats. Although J-hooks work reasonably well, these components sometimes exhibit free-plays and rattling noise due at least in part to dimension tolerances of the structure components, the trim cover could detach.

Accordingly, there is a need for improved fastening components for attaching vehicle interior trim to structural components.

SUMMARY

In at least one embodiment, the present invention solves one or more problems of the prior art by providing a J-hook retainer for attaching vehicle trim to a structural component. The J-hook hook retainer includes a rigid structural component shaped with a hooked end. The hooked end defines a curved section for receiving a vehicle structural component. A soft rubber section is applied to or molded with the rigid structural component. The J-hook retainer holds a trim fabric in place over a vehicle component frame. Advantageously, the soft rubber section minimizes free play and rattling as well as assisting in avoiding sliding in case of partial contact between the J-hook retainer and vehicle component frame.

BRIEF DESCRIPTION OF THE DRAWINGS

Exemplary embodiments of the present invention will become more fully understood from the detailed description and the accompanying drawings, wherein:

FIG. 3A is a perspective view of a vehicle seat bottom frame; and

FIG. 3B is a cross section of a vehicle seat bottom structural component attached by a J-hook to a seat cover.

DETAILED DESCRIPTION

Figure 1A:
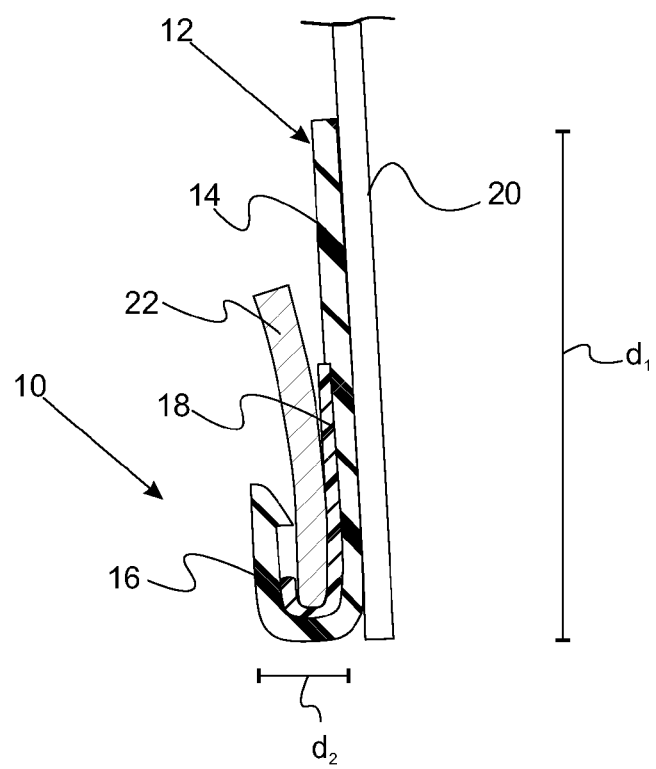
FIG. 1A is a schematic cross section of a J-hook retainer with an over-coated rubber section to reduce rattling.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1B:
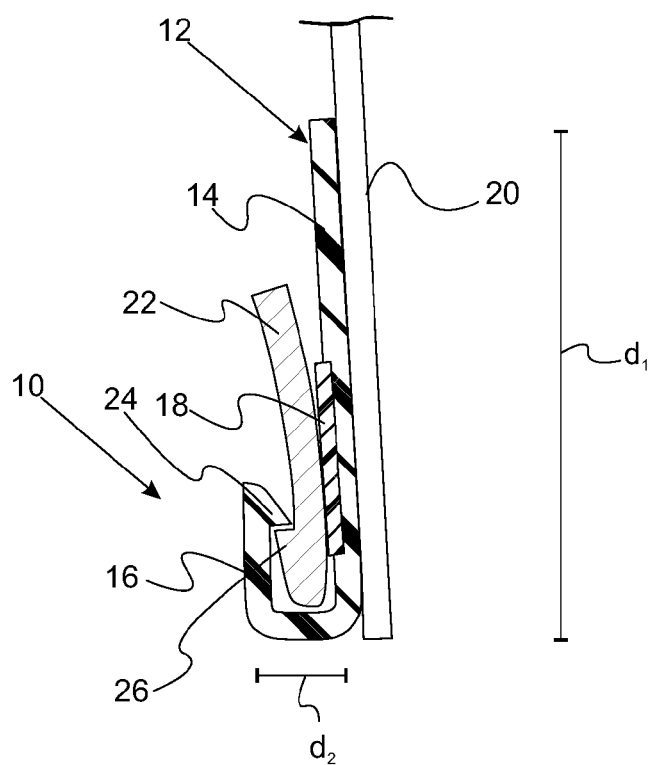
FIG. 1B is a schematic cross section of a J-hook retainer with an over-coated rubber section to reduce rattling.

With reference to FIG. 1A and 1B, schematic cross sections of J-hook retainers are provided. J-hook retainer 10 is typically used to attach interior trim to a vehicle component such as a passenger seat or head restraint. The J-hook retainer 10 includes a rigid structural component 12 having shank side 14 connected to hooked end 16. Hooked end 16 defines a curved, generally U-shaped, section for receiving and holding (i.e., hooking onto) a vehicle structural component as set forth below. Shank side 14 may be substantially straight or curved. The distance $d_1$ gives the extent of the J-hook retainer on the shank side. Distance d1 is typically from about 1 to 8 cm. The distance $d_2$ gives the width across the hooked end. Distance $d_2$ is typically from about 0.5 to about 2 cm. In the refinement depicted in FIG. 1, the rubber is applied shank side 14. In a refinement, rigid structural component 12 is a strip with a hooked end. J-hook retainer 10 is typically formed from a metal or a plastic, and in particular, a rigid plastic. In a refinement, suitable material from which rigid structural component 12 is formed have a flexural modulus greater than 0.5 GPa (gigapascal). As used herein the flexural modulus and Young's modulus refer to though properties at 25° C. In a further refinement, suitable rigid materials have a flexural modulus from 0.5 GPa to 5 GPa. The flexural modulus as used herein may be determined by any suitable test including for example ASTM D 790 . Alternatively, the rigid component is characterized by a Young's Modulus that is greater than 0.5 GPa. Typically, the Young's Modulus of the rigid component is from 0.5 to 500 GPa; 1 to 400 GPa; 2 to 200 GPa; or 3 to 100 GPa in increasing order of preference. Suitable rigid plastics include, but are not limited to, polyolefins and other thermoplastic polymers. Specific examples include, but are not limited to, acrylonitrile butadiene styrene (ABS), polypropylene, polyethylene, acetal copolymer, acrylic, nylon, polycarbonate, polyamide, polystyrene, and the like.

J-hook retainer 10 includes a rubber section 18 applied to or molded with rigid structural component 12. J-hook retainer 10 holds trim fabric 20 in place over vehicle component frame 22. Vehicle component frame 22 can be either metal, plastic or other stiff materials. Advantageously, rubber section 18 minimizes free play and rattling as well as assisting in avoiding sliding and detachment in case of partial contact between J-hook retainer 10 and vehicle component frame 22. Rubber section 18 is typically characterized by a Young's Modulus that is less than 0.5 GPa. In a refinement, rubber section has a Young's Modulus that is less than 0.1 GPa. Typically, rubber section has a Young's Modulus from about 0.01 GPa to about 0.1 GPa.

In a variation of the J-hook retainer, rubber section 18 is formed from an elastomer. Examples of suitable elastomers include, but are not limited to, natural polyisoprene rubbers, synthetic chloroprene rubber, polyisoprene rubber, butadiene rubber, butyl rubbers, halogenated butyl rubbers, styrene-butadiene rubber, nitrile rubbers, ethylene propylene rubber (EPM), ethylene propylene diene rubber (EPDM), polyacrylic rubber, silicone rubbers, fluoroelastomers, ethylene-vinyl acetate, and the like.

FIG. 1A provides a schematic cross-section of a variation of J-hook 10 having barbed ends that assist in retaining the J-hook after installation. In this variation, rigid structural component includes barbed end 24 and vehicle component frame 22 includes barbed end 26. Barb ends 24 and 26 interlock to hold J-hook 10 in place.

Figure 2:
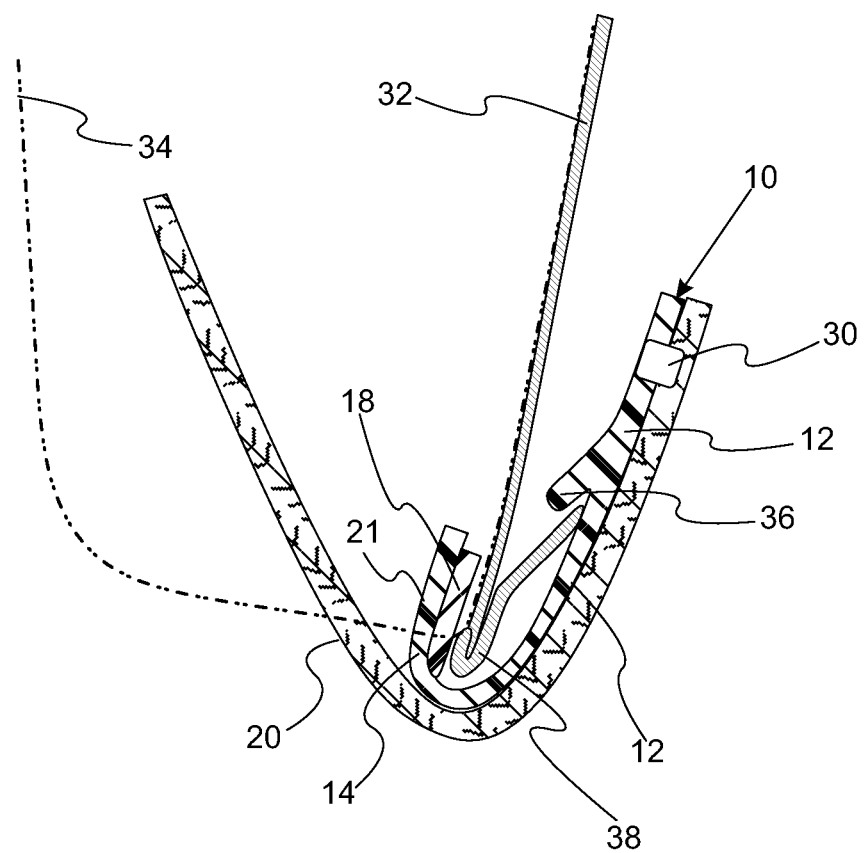
FIG. 2 is a schematic cross section of a J-hook retainer with an over-coated rubber section to reduce rattling.

FIG. 2 provides a variation of the J-hook retainer used to attach interior trim to a vehicle component such as a passenger seat or head restraint. The J-hook retainer 10 includes a rigid structural component 12 shaped with a hooked end 14. J-hook retainer 10 includes a soft rubber section 18 applied to or molded with rigid structural component 12. In the refinement depicted in FIG. 2, the rubber is applied to on bite side 21. J-hook retainer 10 holds trim fabric 20 in place over vehicle component frame 32. Attachment 30 is used to secure trim fabric 20 to J-hook retainer 10. In a refinement, attachment 30 is a weld, bolt, or an adhesive. In another refinement, j-hook retainer 10 is sewn to trim fabric 20. J-hook retainer 10 is depicted holds the trim to cushion metal frame 32. In another refinement, J-hook retainer 10 includes retainer feature 36 for holding the J-hook to retainer 38 which is secured to or integrated with metal frame 32. Typically, retainer feature 36 is a protrusion extending from the shank side of structural component 12. This attachment of retainer 38 to metal frame 32 may be accomplished by welding if retainer 38 is metal or by adhesive bonding if retainer 38 is a rigid plastic.

FIGS. 3A and 3B provide schematics illustrating the application of the J-hooks set forth above in holding a vehicle seat cover in place of a vehicle set bottom. FIG. 3A is a perspective view of a vehicle seat bottom frame while FIG. 3B is a cross section of a vehicle seat bottom structural component attached by a J-hook to a seat cover. Vehicle seat bottom frame 40 include structural component 42. Vehicle seat cover 44 is held in place over structural component 42 by J-hook 10 which is attached to vehicle seat cover 44. In a refinement, structural component 42 includes bent end 46 that attaches to J-hook 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A J-hook retainer for attaching interior trim to a vehicle component, the J-hook retainer comprising:
   a rigid structural component shaped with a hooked end, the hooked end defining a curved section for receiving a vehicle structural component, the rigid structural component including a shank side and a bite side with a protrusion extending from the shank side, the protrusion being a retainer feature that holds the J-hook retainer to a retainer component that is integrated with the vehicle structural component; and
   a soft rubber section is disposed over a portion of the rigid structural component.

2. The J-hook retainer of claim 1 wherein the rubber section is molded to the rigid structural component.

3. The J-hook retainer of claim 1 wherein the rigid structural component has a flexural modulus greater than 0.5 GPa.

4. The J-hook retainer of claim 1 wherein the rigid structural component has a flexural modulus from 0.5 GPa to 5 GPa.

5. The J-hook retainer of claim 1 wherein the rigid structure component comprises a component selected from the group consisting of thermoplastic polymers.

6. The J-hook retainer of claim 1 wherein the rigid structure component comprises a component selected from the group consisting of acrylonitrile butadiene styrene (ABS), polypropylene, polyethylene, acetal copolymer, acrylic, nylon, polycarbonate, polyamide, polystyrene, and combinations thereof.

7. The J-hook retainer of claim 1 wherein the rubber section has a Young's Modulus that is less than 0.5 GPa.

8. The J-hook retainer of claim 1 wherein the rubber section has a Young's Modulus from about 0.01 GPa to about 0.1 GPa.

9. The J-hook retainer of claim 1 wherein the rubber section comprises an elastomer.

10. The J-hook retainer of claim 1 wherein the rubber section comprises a component selected from the group consisting of natural polyisoprene rubbers, synthetic chloroprene rubber, polyisoprene rubber, butadiene rubber, butyl rubbers, halogenated butyl rubbers, styrene-butadiene rubber, nitrile rubbers, ethylene propylene rubber (EPM), ethylene propylene diene rubber (EPDM), polyacrylic rubber, silicone rubbers, fluoroelastorners, ethylene-vinyl acetate, and combinations thereof.

11. The J-hook retainer of claim 1 wherein the rubber section is disposed on the shank side.

12. The J-hook retainer of claim 1 wherein the rubber section is disposed on the bite side.

13. The J-hook retainer of claim 1 wherein the rigid structural component includes a barbed that interlocks with a barbed end of a vehicle component for holding the J-hook retainer in place.

\* \* \* \* \*